United States Patent
Rhodes et al.

(10) Patent No.: US 9,676,429 B1
(45) Date of Patent: Jun. 13, 2017

(54) VERTICAL COUPLING FIFTH WHEEL DEVICE AND METHOD OF USE

(71) Applicant: Fontaine Fifth Wheel Company, Trussville, AL (US)

(72) Inventors: James Matthew Rhodes, Pelham, AL (US); Robert Keith Laney, Vinemont, AL (US); Steven W. Mann, Gardendale, AL (US)

(73) Assignee: Fountaine Fifth Wheel Company, Trussville, AL (US)

( * ) Notice: Subject to any disclaimer, the term of this patent is extended or adjusted under 35 U.S.C. 154(b) by 172 days.

(21) Appl. No.: 14/493,507

(22) Filed: Sep. 23, 2014

Related U.S. Application Data (60) Provisional application No. 61/881,694, filed on Sep. 24, 2013.

(51) Int. Cl.
  *B62D 53/06*  (2006.01)
  *B62D 53/08*  (2006.01)
  *B62D 53/10*  (2006.01)

(52) U.S. Cl.
  CPC ......... *B62D 53/0814* (2013.01); *B62D 53/10* (2013.01)

(58) Field of Classification Search
  CPC .......................... B62D 53/0814; B62D 53/10
  USPC ............ 280/425.1, 433, 434, 435, 436, 437
  See application file for complete search history.

(56) References Cited

U.S. PATENT DOCUMENTS

| | | | |
|---|---|---|---|
| 1,260,027 A | 3/1918 | Peets et al. | |
| 1,595,902 A | 8/1926 | Mayer | |
| 2,320,278 A | 5/1943 | Johnston | |
| 2,967,721 A | 1/1961 | Helton | |
| 3,002,767 A * | 10/1961 | Gresko | B62D 53/10 280/434 |
| 3,337,170 A * | 8/1967 | Remy | B60S 9/04 254/126 |
| 3,534,983 A | 10/1970 | Alvey | |
| 3,552,774 A * | 1/1971 | Gottler | B62D 53/0821 280/425.1 |
| 3,649,047 A * | 3/1972 | Plantan | B62D 53/0821 280/423.1 |

(Continued)

FOREIGN PATENT DOCUMENTS

EP           0 494 160 B1     11/1994

*Primary Examiner* — Jacob Knutson
(74) *Attorney, Agent, or Firm* — Andrus Intellectual Property Law LLP (57) ABSTRACT

A fifth wheel coupling device is adapted for a towing vehicle that vertically receives a kingpin of a trailer. The device includes a plate having a kingpin hole formed therethrough defining a vertical path adapted to permit entry of the kingpin into the kingpin hole and through the plate along the vertical path, and to prevent release of the kingpin out of the kingpin hole along a lateral path leading outside the plate. A support base is attached to the plate, and is adapted to mount the plate to the towing vehicle. A lifting mechanism is operatively connected to the plate and is adapted to be mounted on the towing vehicle for raising and lowering the plate relative to the trailer. A locking mechanism is movably attached to the plate and is provided with an actuating portion. The locking mechanism is configured to be automatically actuable and adapted for releasably locking the kingpin relative to the plate and the locking mechanism upon engagement of the kingpin with the actuating portion of the locking mechanism.

17 Claims, 10 Drawing Sheets

(56) References Cited

U.S. PATENT DOCUMENTS

| | | | |
|---|---|---|---|
| 3,810,663 A * | 5/1974 | Berends | B62D 53/0821 |
| | | | 280/425.1 |
| 3,870,342 A | 3/1975 | Baxter et al. | |
| 3,887,251 A | 6/1975 | McKay | |
| 4,204,700 A * | 5/1980 | Haines, Sr. | B62D 53/0878 |
| | | | 280/432 |
| 4,659,101 A * | 4/1987 | Buckley | B62D 53/10 |
| | | | 280/434 |
| 4,671,527 A * | 6/1987 | Wilson | B62D 53/0821 |
| | | | 280/407 |
| 4,718,800 A * | 1/1988 | Engle | B61D 45/005 |
| | | | 410/61 |
| 5,294,143 A | 3/1994 | Jarvinen | |
| 5,435,194 A | 7/1995 | Schedrat et al. | |
| 5,438,881 A | 8/1995 | Schedrat et al. | |
| 5,464,241 A * | 11/1995 | Flater | B62D 53/0821 |
| | | | 280/425.1 |
| 5,516,138 A | 5/1996 | Fontaine | |
| 6,439,594 B1 | 8/2002 | Johansson | |
| 7,654,553 B2 * | 2/2010 | Shirk | B62D 53/0857 |
| | | | 280/433 |
| 8,672,340 B1 * | 3/2014 | Hartman | B62D 53/0814 |
| | | | 280/438.1 |
| 2005/0082787 A1 * | 4/2005 | Dick | B62D 49/005 |
| | | | 280/415.1 |
| 2014/0159339 A1 * | 6/2014 | Hartman | B62D 53/0814 |
| | | | 280/433 |

\* cited by examiner

VERTICAL COUPLING FIFTH WHEEL DEVICE AND METHOD OF USE

CROSS-REFERENCE TO RELATED APPLICATION

The present utility application relates to and claims priority to U.S. Provisional Patent Application Ser. No. 61/881,694, filed Sep. 24, 2013, which is incorporated herein in entirety.

FIELD

The present invention relates generally to fifth wheel coupling devices for towing vehicles, such as tractor trucks, that receive kingpins of trailers, and, in particular, to a vertical coupling fifth wheel device and a method for using such device.

BACKGROUND

Towing vehicles, such as tractor trucks or semis and the like, are typically equipped with fifth wheel coupling devices which receive and engage the kingpins of trailers. The fifth wheel coupling device is positioned on the back of the trailer truck and features a hitch plate having a central throat equipped with a latching mechanism which engages the kingpin. The throat is provided with an open end facing the rear of the truck. The kingpin extends downward from the underside of the leading end portion of the trailer. The engagement of the trailer kingpin by the fifth wheel coupling device is the primary means by which the trailer is pivotally connected to the tractor truck.

Prior to hauling a load, the tractor truck must be coupled to the trailer containing the load. This is accomplished by backing the fifth wheel coupling device of the tractor truck towards and under the leading end portion of the trailer so that the trailer kingpin passes horizontally through the open end of the throat and into the throat of the fifth wheel coupling device where it is engaged by a latching or locking mechanism.

If the latching or locking mechanism of a traditional fifth wheel coupling device fails, however, the towing vehicle and the trailer may become uncoupled. Furthermore, the towing vehicle fifth wheel coupling device must be at the proper height with respect to the trailer kingpin height and length for proper coupling to occur.

Through research and experimentation, the present inventors have determined that a need exists for a fifth wheel coupling device and method of using such device that addresses the above issues.

SUMMARY

The present disclosure relates to a fifth wheel coupling device adapted for a towing vehicle that vertically receives a kingpin of a trailer. The device includes a plate having a kingpin formed therethrough defining a vertical path adapted to permit entry of the kingpin into the kingpin hole and through the plate along the vertical path, and to prevent release of the kingpin out of the kingpin hole along a lateral path leading outside the plate. A support base is attached to the plate and is adapted to mount the plate to the towing vehicle. A lifting mechanism is operatively connected to the plate and is adapted to be mounted to the towing vehicle for raising and lowering the plate relative to the trailer so that the kingpin is adaptable to be received and removed vertically relative to the kingpin hole. A locking mechanism is movably attached to the plate and is provided with an actuating portion. The locking mechanism is configured to be automatically actuable and adapted for releasably locking the kingpin relative to the plate and the locking mechanism upon engagement of the kingpin with the actuating portion of the locking mechanism.

The present disclosure further relates to a vehicle for towing a trailer having a kingpin. The vehicle includes a fifth wheel coupling device having a plate formed with a kingpin hole therethrough. The kingpin hole is configured to permit entry of the kingpin into and through the kingpin hole and the plate along a vertical path, and to prevent release of the kingpin out of the kingpin hole along a lateral path leading outside the plate. A support base is attached to the plate for mounting the plate to the towing vehicle. A lifting mechanism is operatively connected to the plate and is mounted to the towing vehicle for lowering and raising the plate relative to the trailer so that the kingpin is able to be received and removed vertically relative to the kingpin hole. A locking device is movably attached to the plate and is provided with an actuating portion. The locking mechanism is configured to be automatically actuable for releasably locking the kingpin relative to the plate and the locking mechanism upon engagement of the kingpin with the actuating portion of the locking mechanism.

The present disclosure also contemplates a method of coupling a towing vehicle and a trailer having a kingpin. The method includes the steps of a) providing the towing vehicle with a fifth wheel coupling device having a plate with a kingpin hole formed therethrough defining a vertical path to permit entry of the kingpin into the kingpin hole and through the plate along a vertical path, and to prevent release of the kingpin out of the kingpin hole along a lateral path leading outside the plate; b) lowering the plate with respect to the kingpin of the trailer; c) vertically aligning the kingpin hole with the kingpin; d) providing relative movement between the kingpin and the plate so that the kingpin enters the kingpin hole along the vertical path; and e) automatically locking the kingpin relative to the plate and the kingpin hole once the kingpin has passed through the kingpin hole and the plate a predetermined distance.

DETAILED DESCRIPTION OF THE DRAWINGS

Figure 1:
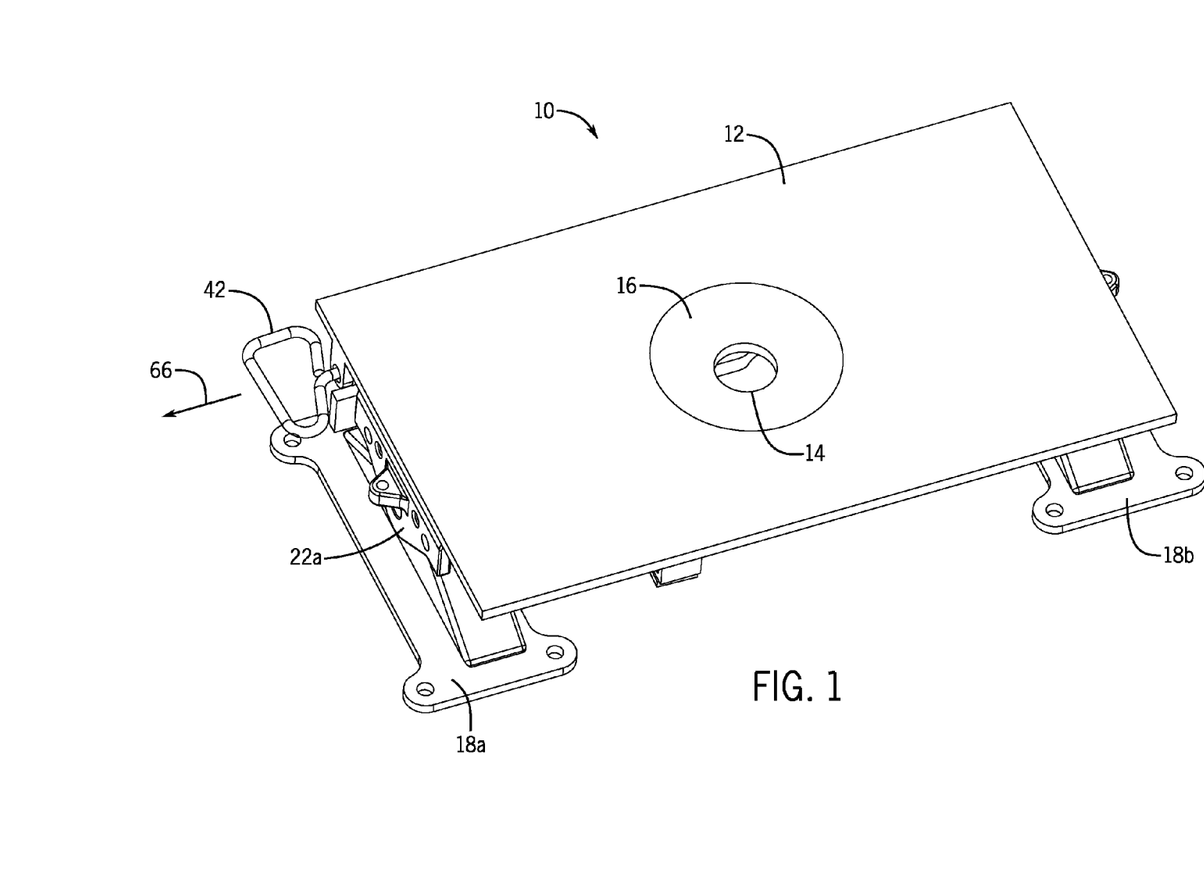
FIG. 1 is a top perspective view of an exemplary embodiment of a fifth wheel coupling device in accordance with the present disclosure.
Figure 2:
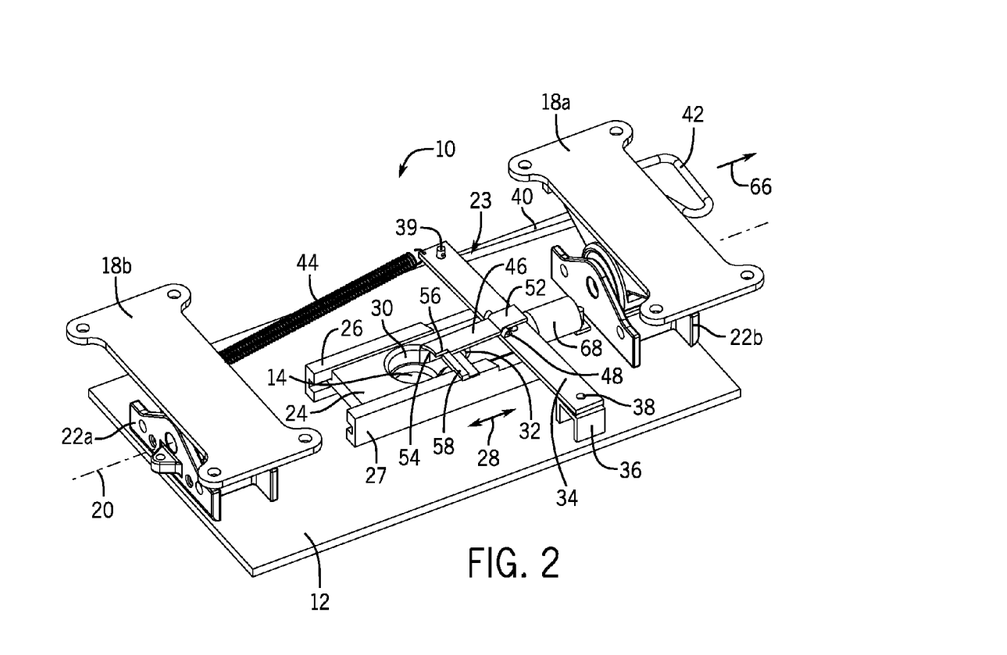
FIG. 2 is a bottom perspective view of the fifth wheel coupling device of FIG. 1 with a locking member in an open position.

A fifth wheel vertical coupling device of the present disclosure is indicated in general by reference numeral 10 in FIGS. 1 and 2. While the disclosure is described below in terms of a tractor truck being used as a towing vehicle and a semitrailer being used as the trailer, it is to be understood that the present disclosure could be applied to other towing vehicle and trailer arrangements.

The fifth wheel coupling device 10 of FIGS. 1 and 2 includes a plate 12 with a kingpin hole 14 located in a generally central position in the plate 12. The plate 12 is preferably constructed of steel (but other materials may be used) and the kingpin hole 14 is sized to allow the kingpin of a trailer to extend through the kingpin hole 14 during coupling of the trailer to the tractor truck, and to permit the kingpin to be removed through the kingpin hole 14 during uncoupling of the trailer to the tractor truck. Preferably surrounding the kingpin hole 14 is a chamfer 16 that aids in aligning the kingpin with the kingpin hole 14 during coupling. In the example shown, the hole 14 has a circular configuration defined by a closed wall receiving structure, but is should be understood that the hole 14 may be defined by other suitable wall receiving structures which permit entry and removal of the kingpin relative to the hole 14 along a vertical path therethrough and prevent the lateral exit therefrom.

The fifth wheel coupling device 10 is connected to the tractor in such a way to allow the plate 12 to pivot. More specifically, a pair of support bases 18a and 18b are pivotally mounted to the bottom surface of the plate 12 via pivot brackets 22a and 22b, respectively. The support bases 18a, 18b are adapted to be mounted to a tractor truck in the manner described below. The top plate 12 and pivot brackets 22a, 22b pivot with respect to the support bases 18a, 18b, and thus the tractor truck about an axis 20 of FIG. 2.

Furthermore, the pivot brackets 22a, 22b are connected to the support bases 18a and 18b in a removable fashion. As a result, plate 12 may be easily removed from the support bases 18a, 18b for service.

Figure 6:
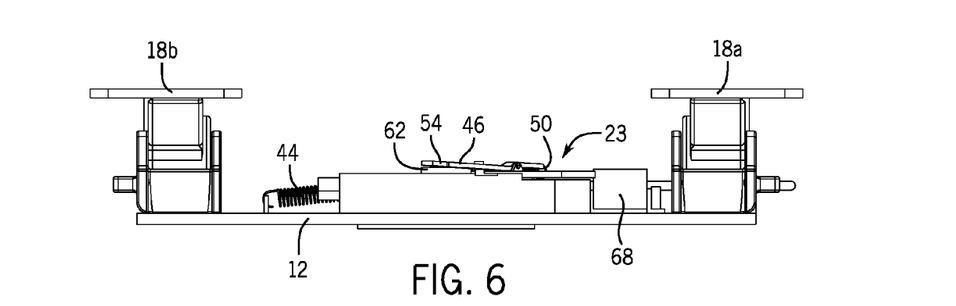
FIG. 6 is a side elevational view of the fifth wheel coupling device with locked kingpin of FIG. 5.

As will be explained in greater detail below, once the kingpin of a trailer extends to a certain depth through the kingpin hole 14 and the plate 12 of the fifth wheel coupling device 10, a "trigger" automatically activates a locking mechanism 23 to capture and retain the kingpin. With reference to FIG. 2, the locking mechanism 23 includes a locking member 24 movably mounted between a pair of slide rails 26 and 27 fixed to the bottom surface of plate 12 so as to slide in reciprocating fashion in the direction of arrows 28. The locking member 24 includes a keyhole opening formed with an enlarged circular portion 30 and a narrowed portion 32. The enlarged portion 30 is alignable with the kingpin hole 14 and plate 12 and is sized and shaped to receive the kingpin of the trailer. The narrowed portion 32 has a width which is less than a width of the keyhole opening 30, and is configured to receive and retain the kingpin so that the kingpin cannot be vertically removed therefrom. The locking member 24 is attached to the middle portion of a lever bar 34. A proximal end of the lever bar 34 is pivotally attached to a bracket 36 secured to the plate 12 by a pivot 38 while a distal end of the lever bar 34 is pivotally attached to a pin 39 of a release handle shaft 40. Release handle shaft 40 terminates in a release handle 42 which extends beyond one side of the plate adjacent pivot bracket 22a. A tension spring 44 is connected between the distal end of the lever bar and the plate 12 (as also shown in FIG. 6) so as to urge the lever bar 34 to pivot in a counterclockwise direction (as viewed in FIG. 2).

Figure 3:
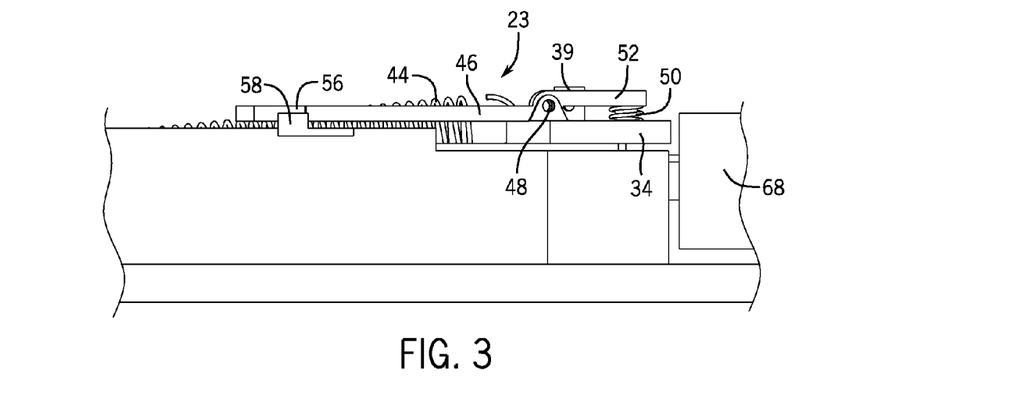
FIG. 3 is a partial enlarged side elevational view of the fifth wheel coupling device of FIG. 2.

As illustrated in FIGS. 2 and 3, the locking mechanism 23 has an actuating portion in the form of a trigger mechanism that includes a trigger 46 which is mounted generally to the middle portion of the lever bar 34 by a pivot 48. A trigger compression spring 50 is positioned between a distal end portion 52 of the trigger 46 and the lever bar 34 so as to urge the trigger 46 to pivot in a counterclockwise direction (as viewed in FIG. 3). A proximal end portion 54 of the trigger 46 is provided with a notch that defines a horizontally extending trigger portion 56. A trigger latch 58 is mounted to the top edge of the slide rail 27 in a fixed fashion.

Operation of the trigger mechanism will now be explained.

In FIGS. 2 and 3, the fifth wheel coupling device 10 is illustrated in an open configuration wherein it is ready to receive and couple with a kingpin of a trailer. When in this configuration, the shoulder 56 of the trigger 46 engages the trigger latch 58 so that the tip of the proximal end portion 54 of the trigger 46 projects slightly over the kingpin hole 14.

Figure 4A:
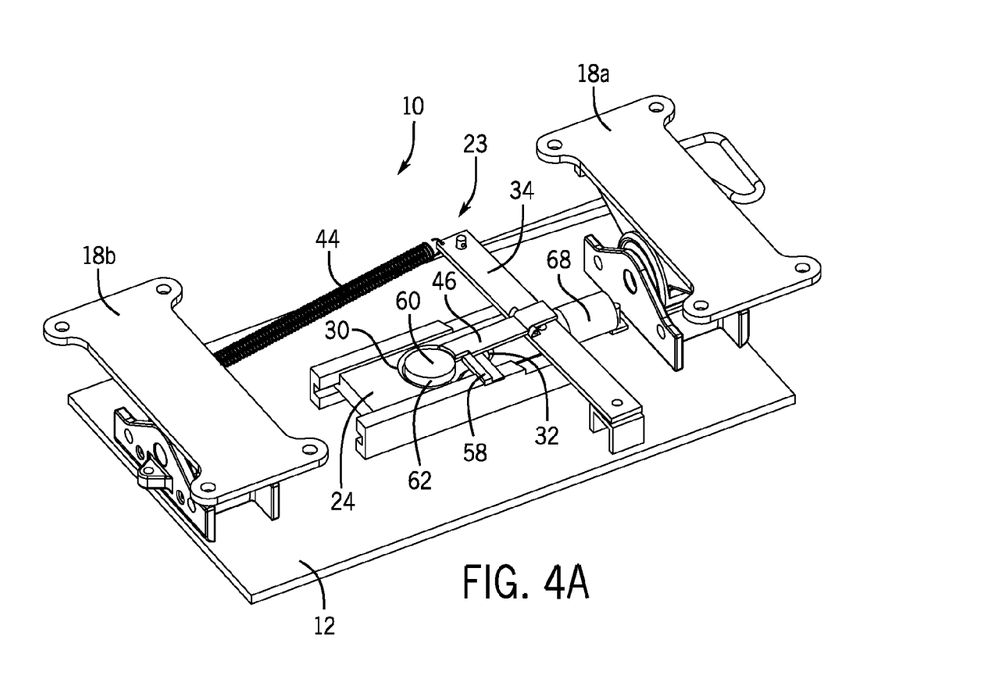
FIGS. 4A-4C are bottom perspective views illustrating a kingpin being inserted and locked into the fifth wheel coupling device of FIGS. 1-3.
Figure 4B:
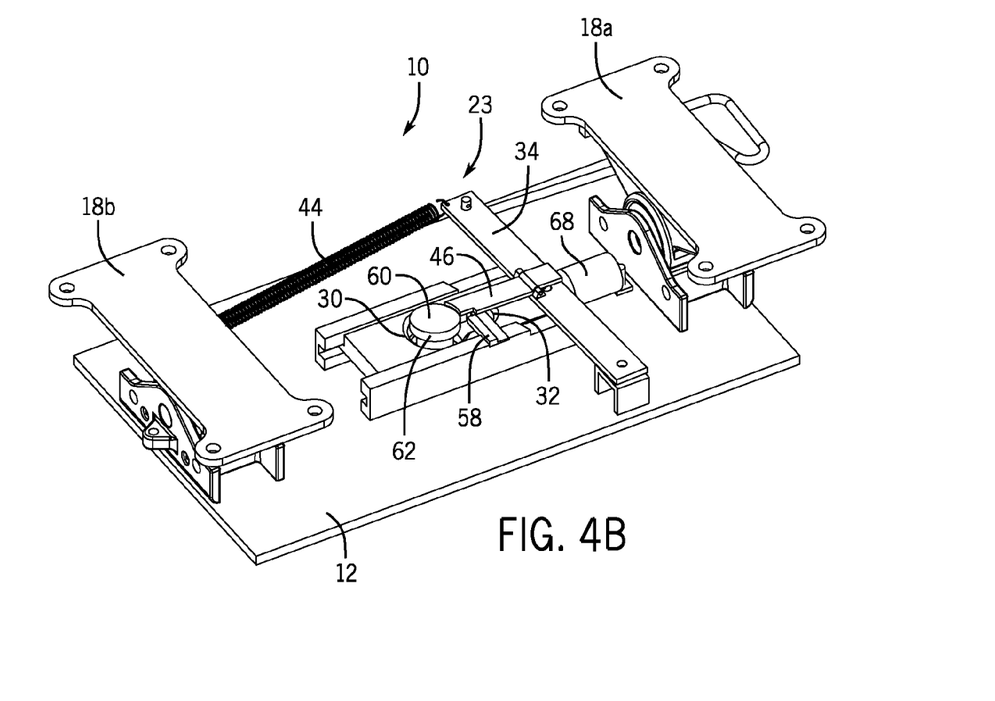
Figure 4C:
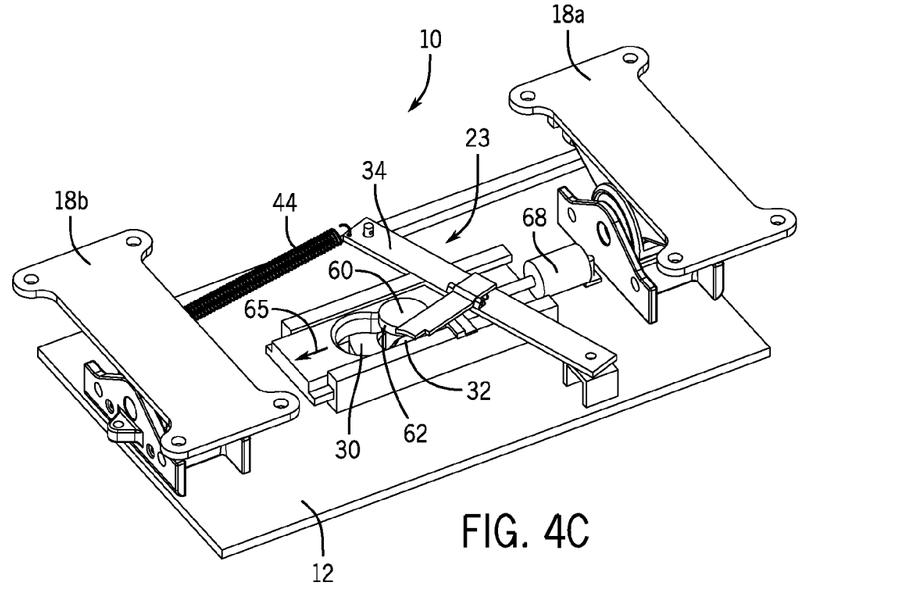
Figure 5:
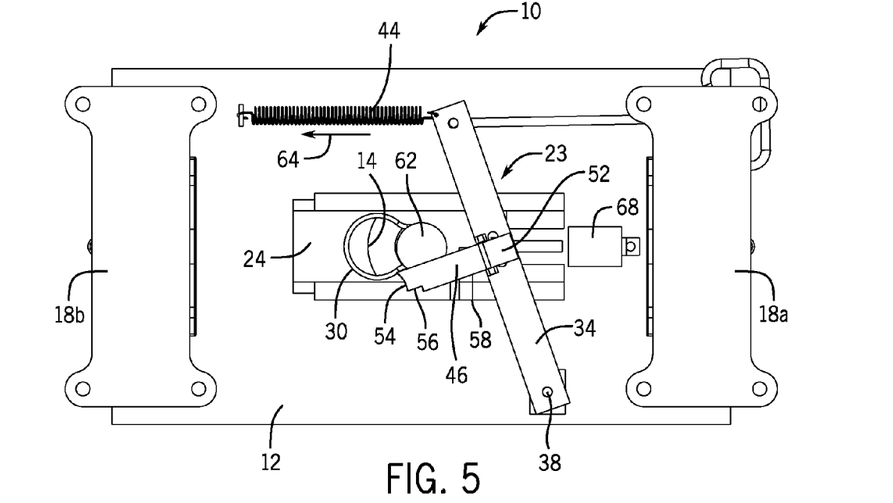
FIG. 5 is a bottom plan view of the fifth wheel coupling device in a locking position with locked kingpin of FIG. 4C.

With reference to FIG. 4A, as a kingpin 60 of a trailer enters the fifth wheel coupling device 10 vertically, the bottom of the kingpin 60 has a flange 62 that contacts the tip of the trigger 46 and begins to push the shoulder 56 of the trigger 46 off the trigger latch 58. With reference to FIG. 4B, as a kingpin 60 continues to enter the hole 14 vertically, the trigger 46 is disengaged from the trigger latch 58 (against the urging of the trigger spring 50 of FIG. 3). The fifth wheel locking member 24 is free to close and capture the shaft of the kingpin 60. More specifically, with reference to FIGS. 4C, 5 and 6 with the trigger 46 free of the trigger latch 58, the lever bar 34 is free to pivot under the urging of spring 44 (in the direction of arrow 64 of FIG. 5) so that the locking member 24 slides in the direction of arrow 65 into the locking position illustrated in FIG. 4C. As a result, the shaft of the kingpin 60 is slidably received within the narrowed portion 32 of the keyhole opening of the locking member 24 so as to be positively locked into the fifth wheel coupling device 10. As best illustrated in FIGS. 5 and 6, the proximal end portion 54 of the trigger 46 rests on the bottom of the flange 62 of the kingpin 60 against the urging of trigger spring 50.

It should be appreciated that entry of the kingpin 60 along a vertical path through the aligned hole 14 in plate 12 and the enlarged portion 30 of keyhole opening and locking member 24 over a predetermined distance leading to engagement with the trigger 46 and shifting of the locking member 24 results in an automatic locking of the kingpin 60 in the coupling device 10 which is designed to prevent uncoupling of the towing vehicle and trailer.

Figure 7:
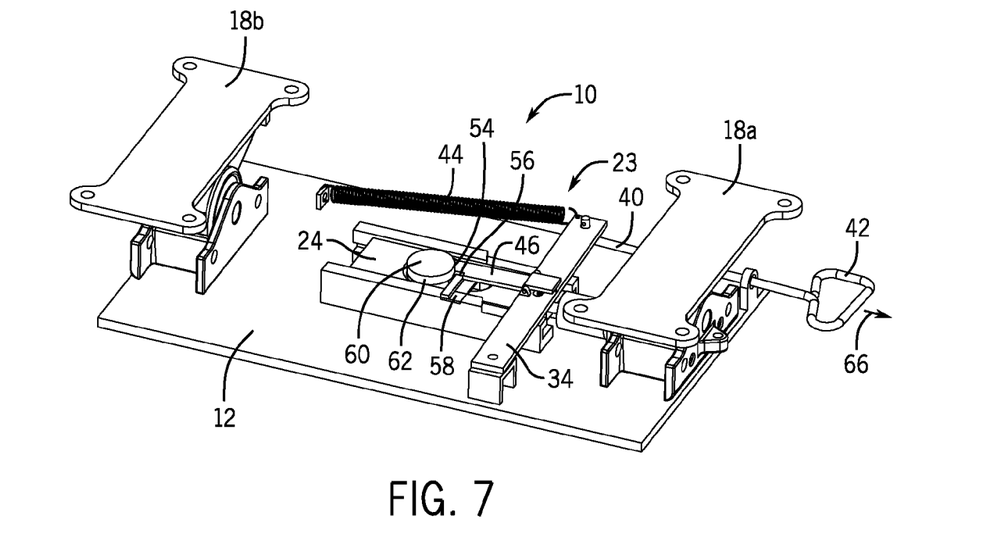
FIG. 7 is a bottom perspective view of the fifth wheel coupling device of FIGS. 1-6 after a release handle has been pulled, but before the kingpin has been vertically removed.
Figure 8:
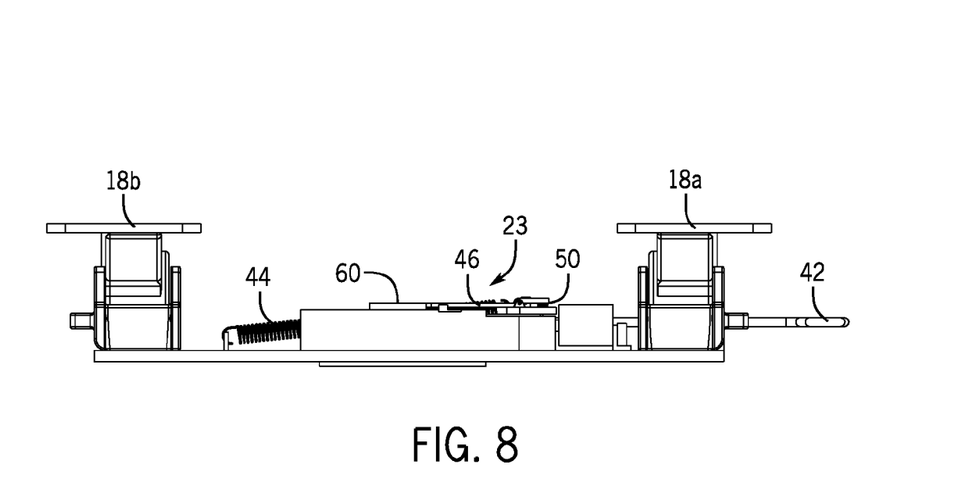
FIG. 8 is a side elevational view of the fifth wheel coupling device and kingpin of FIG. 7.
Figure 9:
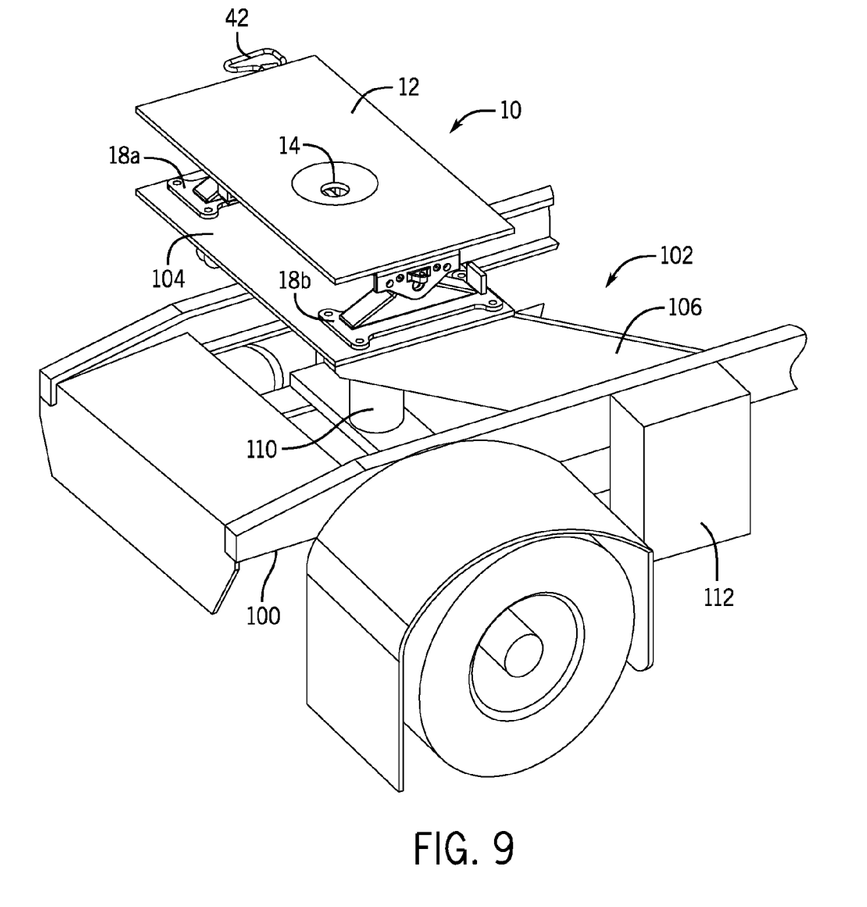
FIG. 9 is a partial rear perspective view showing the fifth wheel coupling device of FIGS. 1-8 mounted on a tractor truck via a boom.
Figure 10:
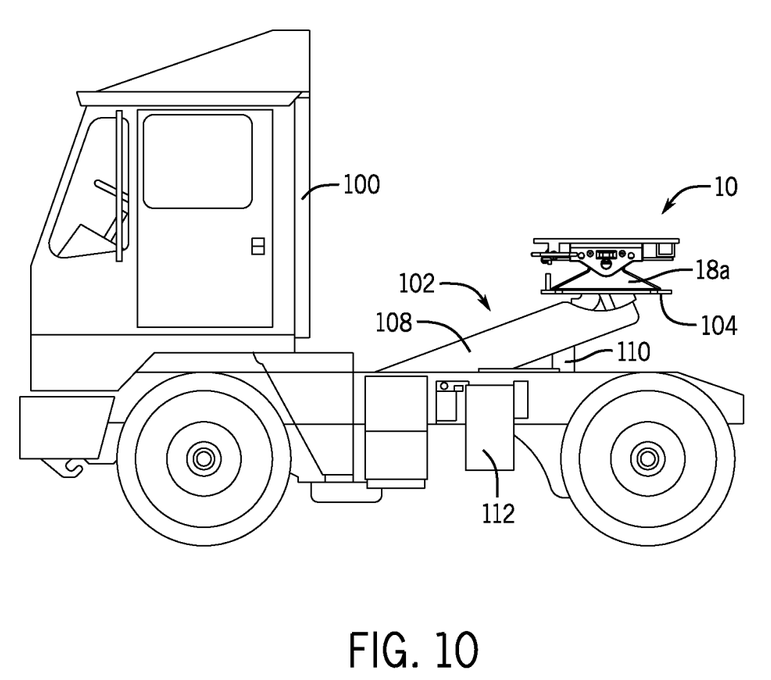
FIG. 10 is a side elevational view of the tractor truck of FIG. 9.
Figure 11:
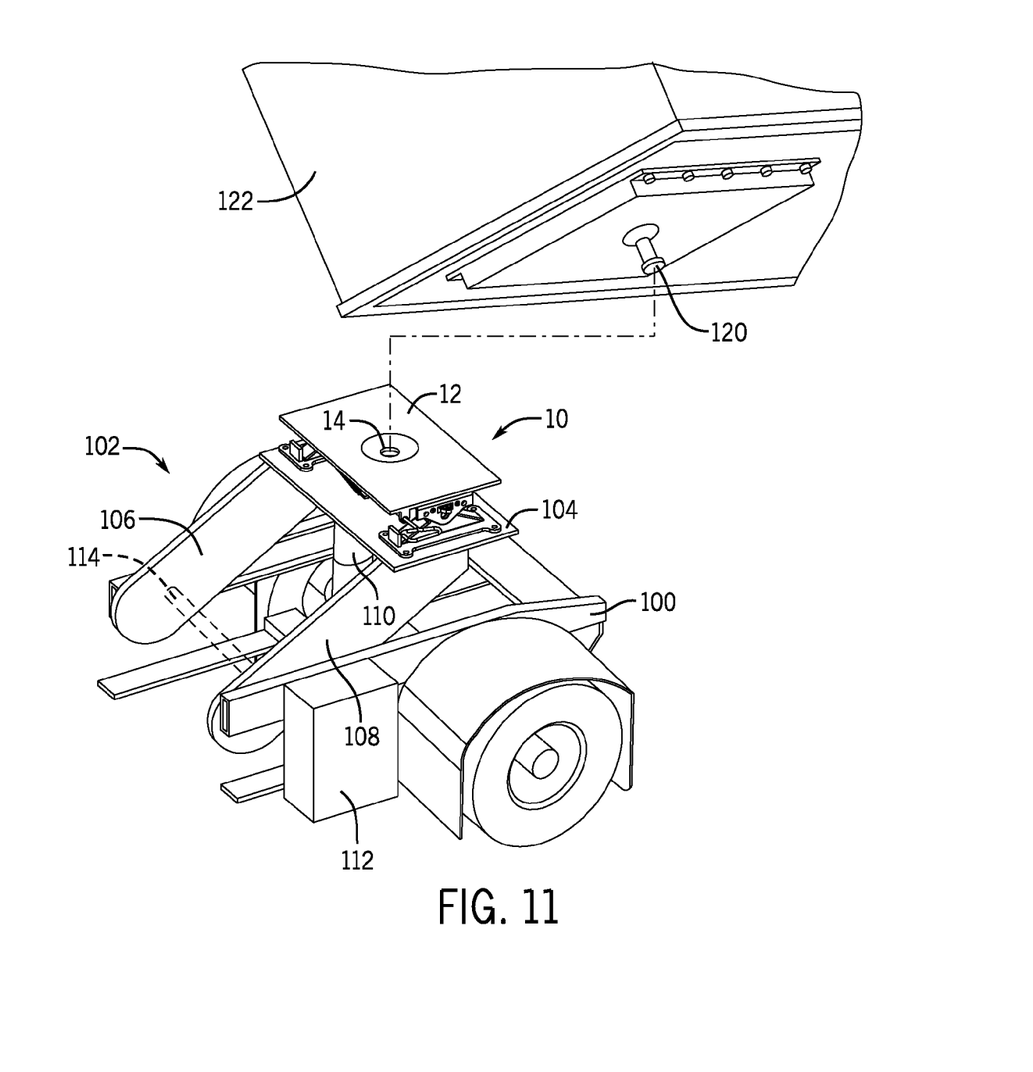
FIG. 11 is a partial front perspective view of the tractor truck and fifth wheel coupling device of FIGS. 9 and 10 with a trailer kingpin being coupled thereto.

When it is desired to remove the kingpin 60 from the fifth wheel coupling device 10 (so as to uncouple the trailer from the tractor truck), the driver or other user pulls release handle 42 in the direction of arrow 66 (FIG. 7). Movement of the release handle 42 in the direction of arrow 66 causes a lever bar 34 to pivot in a counterclockwise direction (about pivot 38 of FIGS. 2 and 5) against the urging of spring 44 so that the locking member 24 slides to align the enlarged portion 30 of the keyhole opening with the kingpin hole 14 of the plate 12, as illustrated in FIGS. 7 and 8. When the locking member 24 is in this position, the tip of the trigger 46 comes to rest against the side of the flange 62 of the kingpin 60 due to the upward urging of the trigger spring 50. This is also illustrated in FIGS. 7 and 8. This keeps the fifth wheel coupling device 10 unlocked or open until the kingpin 60 can be removed therefrom. The kingpin 60 may then be vertically raised (or the fifth wheel coupling device 10 lowered with respect to the kingpin 60) and removed from the fifth wheel coupling device 10 so that the tractor truck and trailer are uncoupled. That is, relative vertical movement occurs between the coupling device 10 and the kingpin 60 during uncoupling as well as coupling of the tractor truck and the trailer.

As the kingpin 60 is removed from the fifth wheel coupling device 10, the trigger 46 engages the trigger latch 58 which keeps the fifth wheel coupling device 10 open and awaiting the next coupling with a kingpin 60. As a result, after the kingpin 60 is removed from the fifth wheel coupling device 10, the trigger mechanism and locking member 24 is in the position illustrated in FIGS. 2 and 3, with the shoulder 56 of the trigger 46 in engagement with the trigger latch 58.

The locking member 24 may optionally be attached to a hydraulic or pneumatic cylinder 68 (FIGS. 2, 3 and 4A-4C). Alternatively, the cylinder 68 may be a solenoid. In such embodiments, the locking member 24 is actuated to lock the kingpin 60 in the kingpin hole 14 of the fifth wheel coupling device 10 when the cylinder 68 is activated by the driver using an associated switch within the cab or in another position on the truck. The fifth wheel coupling device 10 may also be provided with a sensor that automatically activates the cylinder/solenoid 68 when the kingpin 60 is positioned within the kingpin hole 14.

As is apparent from the above, the entire premise of this coupling device 10 and method of use requires that the fifth wheel coupling device 10 move in a generally vertical direction relative to the kingpin 60, or the kingpin 60 move in a generally vertical direction relative to the fifth wheel coupling device 10 to complete the coupling/uncoupling process. This may be accomplished in a number of different ways known in the art. For example, as illustrated in FIGS. 9-12, the fifth wheel coupling device 10 may be mounted to the rear portion of a tractor truck 100 by a boom mechanism, indicated in general at 102. More specifically, the support bases 18a and 18b are mounted to a platform 104 that is mounted on a pair of boom arms 106 and 108. As best illustrated in FIG. 7, the boom arms 106, 108 are pivotally attached by their bottom ends to the frame rails of the tractor truck 100. The platform 104 and thus the fifth wheel coupling device 10, is raised and lowered by one or more pneumatic or hydraulic lift cylinders, such as the one illustrated at 110, while the boom arms 106 and 108 pivot simultaneously and in parallel. Alternative locations and number of hydraulic lift cylinders may be used to actuate the boom arms 106 and 108 to raise and lower the platform 104 and the fifth wheel coupling device 10 with respect to a kingpin 120 (FIG. 1) of a trailer 122.

Compartments 112 mounted on the tractor truck 100 may contain the hydraulic or pneumatic pumps and other components to activate the hydraulic cylinder 110. Alternatively, with reference to FIG. 11, an axle 114 may be provided between the bottom ends of the boom ends 106 and 108 concentric with the pivot axis of the boom arms 106, 108. One or more gears may be mounted on the axle 114 which may be engaged by a suitable gear drive mechanism including, for example, an electric motor or a connection to the tractor truck engine, to raise and lower the boom arms 106, 108, platform 104 and fifth wheel coupling device 10.

An example of a suitable boom arrangement is the boom arrangement of the Ottawa terminal tractor available from Cargotech Solutions LLC of Ottawa, Kans. An alternative arrangement may include one of the Bartlett models of fifth wheel lifting devices offered by Kalmar Industries Corporation of Ottawa, Kans. Other alternative arrangements may incorporate the electric, hydraulic or pneumatic systems typically used for moving trailer landing legs as a system for raising and lowering the fifth wheel coupling device 10. An example of such a system is the PowerGear system available from Power-Packer of Mishawaka, Ind.

Figure 12:
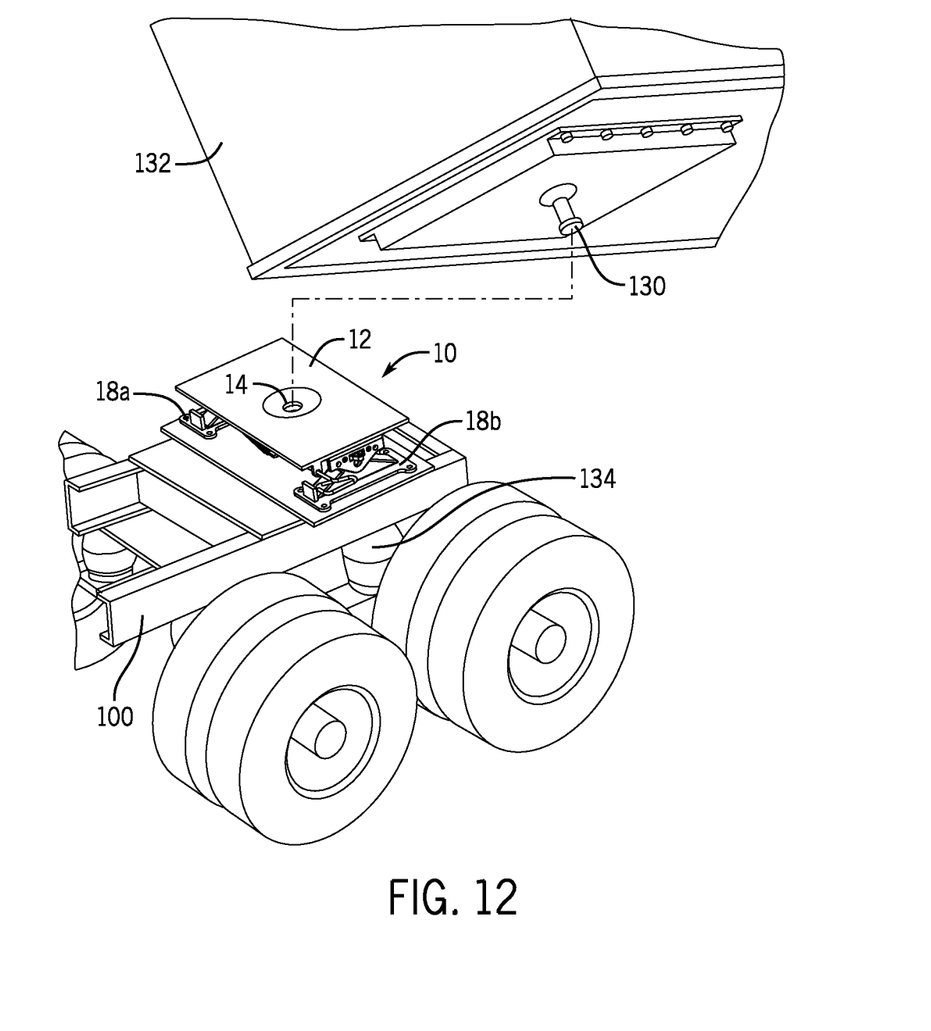
FIG. 12 is a partial front perspective view showing the fifth wheel coupling device of FIGS. 1-8 mounted in the trailer truck where a tractor truck airbag suspension is used to lower and raise the fifth wheel coupling device for coupling to the kingpin of a trailer.

In an alternative embodiment illustrated in FIG. 12, raising and lowering of the fifth wheel coupling device 10 with respect to the kingpin 130 of a trailer 132 is accomplished by inflating/deflating the airbags 134 on the suspension of the tractor truck 100. In this embodiment, the support bases 18a and 18b of the fifth wheel coupling device 10 may be mounted to the frame of the tractor truck 100 in a fixed fashion.

As noted previously, trailers are typically coupled to tractor trucks with an entrance to an open-ended throat of the fifth wheel coupling device from the rear. By allowing the entrance of the kingpin 60, 120, 130 only from the top along a vertical path, the embodiments of the fifth wheel coupling device 10 described above provide less opportunity for an improper couple. Since the kingpins (120 of FIG. 11 or 130 FIG. 12) enter the fifth wheel kingpin hole 14 vertically, the only way the kingpin 120 or 130 can be removed is vertically (i.e. the kingpin cannot slip laterally such as out of the rear of the fifth wheel coupling device. The fifth wheel coupling device 10 is configured with a locking mechanism 23 which is automatically actuable by engagement with the kingpin 60, 120, 130 to secure the kingpin 60, 120, 130 once the kingpin has passed vertically through an aligned hole arrangement 14, 30 in the plate 12 and the locking mechanism 23. By providing relative vertical movement between the fifth wheel coupling device 10 and the kingpin 60, 120, 130 during coupling to trigger the fifth wheel locking mechanism 23, the initial height of the fifth wheel coupling device 10 is not as critical as with traditional rear entry fifth wheel coupling devices.

While the preferred embodiments of the invention have been shown and described, it will be apparent to those skilled in the art that changes and modifications may be made therein without departing from the spirit of the invention.

What is claimed is:

1. A fifth wheel coupling device adapted for a towing vehicle that vertically receives a kingpin of a trailer, the device comprising:

a plate having a kingpin hole formed therethrough defining a vertical path adapted to permit entry of the kingpin into the kingpin hole and through the plate along the vertical path, and to prevent release of the kingpin out of the kingpin hole along a lateral path leading outside the plate;

a support base attached to the plate and adapted to mount the plate to the towing vehicle;

a lifting mechanism operatively connected to the plate and adapted to be mounted to the towing vehicle for raising and lowering the plate relative to the trailer so that the kingpin is able to be received and removed vertically relative to the kingpin hole;

a chamfer in the plate surrounding the kingpin hole that funnels the kingpin into the kingpin hole during coupling; and a locking mechanism movably attached to the plate and provided with an actuating portion, the locking mechanism being configured to be automatically actuable and adapted for releasably locking the kingpin relative to the plate and the locking mechanism upon engagement of the kingpin with the actuating portion of the locking mechanism.

2. The fifth wheel coupling device of claim 1 wherein the plate is pivotally mounted to the support base.

3. The fifth wheel coupling device of claim 1 wherein the locking mechanism is hydraulic, pneumatic, mechanical or electronic.

4. The fifth wheel coupling device of claim 1 wherein the locking mechanism includes a trigger mechanism that is manual, automatic, mechanical or electronic.

5. The fifth wheel coupling device of claim 1 wherein the lifting mechanism includes:
   a platform upon which the support base is mounted;
   a boom arm upon which the platform is mounted, the boom arm being adapted to be pivotally mounted to the towing vehicle; and
   a drive system for actuating the boom arm to lift the platform.

6. The fifth wheel coupling device of claim 1 wherein the lifting mechanism includes deflatable air bags adapted to be mounted on the towing vehicle.

7. The fifth wheel coupling device of claim 1 wherein the locking mechanism includes a lever bar having a proximal and distal end, with the proximal end pivotally attached to the plate, a locking member having a keyhole opening, the locking member attached to a middle portion of the lever bar and attached to the plate in a sliding fashion, a spring attached to the distal end of the lever bar and a release handle shaft also attached to the distal end of the lever bar, the spring urging the lever bar into a locking position where a narrowed portion of the key hole opening of the locking member is aligned with the kingpin hole of the plate.

8. The fifth wheel coupling device of claim 7 further comprising a trigger pivotally attached to the lever bar and a trigger latch attached to the plate, the trigger engaging the trigger latch and having a tip positioned over the kingpin hole to secure the lever bar in an open position wherein an enlarged portion of the keyhole opening is aligned with the kingpin hole of the plate, a trigger spring urging the trigger to pivot into a position where the trigger contacts the trigger latch when the lever bar is in the open position.

9. A vehicle for towing a trailer having a kingpin, the vehicle comprising:
   a fifth wheel coupling device having a plate formed with a kingpin hole therethrough, the kingpin hole being configured to permit entry of the kingpin into and through the kingpin hole and that plate along a vertical path, and having a closed wall receiving structure that prevents release of the kingpin out of the kingpin hole along a lateral path leading outside the plate;
   a support base attached to the plate for mounting the plate to the towing vehicle;
   a lifting mechanism operatively connected to the plate and mounted to the towing vehicle for lowering and raising the plate relative to the trailer so that the kingpin is able to be received and removed vertically relative to the kingpin hole;
   a locking mechanism movably attached to the plate and provided with an actuating portion, the locking mechanism being configured to be automatically actuable for releasably locking the kingpin relative to the plate and the locking mechanism upon engagement of the kingpin with the actuating portion of the locking mechanism;
   wherein the locking mechanism includes a lever bar having a proximal and distal end, with the proximal end pivotally attached to the plate, a locking member having a keyhole opening, the locking member being attached to a middle portion of the lever bar and attached to the plate in a sliding fashion, a spring attached to the distal end of the lever bar and a release handle shaft also attached to the distal end of the lever bar, the spring urging the lever bar into a locking position where a narrowed portion of the keyhole opening of the locking member is aligned with the kingpin hole of the plate; and
   a trigger pivotally attached to the lever bar and a trigger latch attached to the plate, the trigger engaging the trigger and having a tin positioned over the kingpin hole to secure the lever bar in an open position where an enlarged portion of the keyhole opening is aligned with the kingpin hole of the plate, a trigger spring urging the trigger to pivot into a position where the trigger contacts the trigger latch when the lever bar is in the open position.

10. The vehicle of claim 9 wherein the plate is pivotally mounted to the support base.

11. The vehicle of claim 9 wherein the locking mechanism is hydraulic, pneumatic, mechanical or electronic.

12. The vehicle of claim 9 wherein the locking mechanism includes a trigger mechanism that is manual, automatic, mechanical or electronic.

13. The vehicle of claim 9 wherein the lifting mechanism includes:
   a platform upon which the support base is mounted;
   a boom arm upon which the platform is mounted, the boom arm being pivotally mounted to the vehicle; and
   a drive system for actuating the boom arm to lift the platform.

14. The vehicle of claim 13 wherein the drive system includes a fluid cylinder.

15. The vehicle of claim 13 wherein the drive system includes a gear drive.

16. The vehicle of claim 9, wherein the plate of the fifth wheel coupling device has a chamfer surrounding the kingpin hole that funnels the kingpin into the kingpin hole during coupling.

17. A method of coupling a towing vehicle and a trailer having a kingpin, the method comprising the steps of:
   a) providing the towing vehicle with a fifth wheel coupling device having a plate with a kingpin hole formed therethrough defining a vertical path to permit entry of the kingpin into the kingpin hole and through the plate along the vertical path, and to prevent release of the kingpin out of the kingpin hole along a lateral path leading outside the plate;
   b) lowering the plate with respect to the kingpin of the trailer;
   c) aligning the kingpin hole with the kingpin;

d) providing relative vertical movement between the kingpin and the plate so that the kingpin enters the kingpin hole along the vertical path;
d) wherein the plate of the fifth wheel coupling device has a chamfer surrounding the kingpin hole that funnels the kingpin into the kingpin hole during coupling; and
f) automatically locking the kingpin relative to the plate and the kingpin hole once the kingpin has passed through the kingpin hole and the plate a predetermined distance.

* * * * *

UNITED STATES PATENT AND TRADEMARK OFFICE
CERTIFICATE OF CORRECTION

PATENT NO.        : 9,676,429 B1                                          Page 1 of 1
APPLICATION NO.   : 14/493507
DATED             : June 13, 2017
INVENTOR(S)       : James Matthew Rhodes, Robert Keith Laney and Steven W. Mann It is certified that error appears in the above-identified patent and that said Letters Patent is hereby corrected as shown below:

In the Claims

In Column 8, Line 26, Claim 9, after "trigger" insert --latch-- and replace "tin" with --tip--.

Signed and Sealed this
First Day of August, 2017

Joseph Matal
*Performing the Functions and Duties of the*
*Under Secretary of Commerce for Intellectual Property and*
*Director of the United States Patent and Trademark Office*